United States Patent
Gupta et al.

(10) Patent No.: US 7,283,289 B2
(45) Date of Patent: Oct. 16, 2007

(54) PROJECTION SYSTEM MODULATOR REDUCING DISTORTION AND FIELD CURVATURE EFFECTS OF PROJECTION SYSTEM LENS

(75) Inventors: Anurag Gupta, Corvallis, OR (US); Scott Lerner, Corvallis, OR (US); P. Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 11/193,918

(22) Filed: Jul. 30, 2005

(65) Prior Publication Data
US 2007/0024944 A1 Feb. 1, 2007

(51) Int. Cl.
*G02B 26/00* (2006.01)
(52) U.S. Cl. ...................... 359/237; 359/290
(58) Field of Classification Search ........... 359/237
See application file for complete search history.

(56) References Cited

U.S. PATENT DOCUMENTS

| | | | |
|---|---|---|---|
| 3,955,128 A | 5/1976 | Wu et al. | |
| 5,223,971 A | 6/1993 | Magel | |
| 5,355,188 A | 10/1994 | Biles et al. | |
| 6,030,082 A * | 2/2000 | Yamamoto | 353/38 |
| 6,354,707 B1 * | 3/2002 | Jeon et al. | 353/69 |
| 6,416,908 B1 | 7/2002 | Klosner et al. | |
| 6,504,644 B1 | 1/2003 | Sandstrom | |
| 6,707,534 B2 | 3/2004 | Bjorklund et al. | |
| 2004/0263813 A1 | 12/2004 | Smirnov et al. | |

FOREIGN PATENT DOCUMENTS

EP    1 059 555 A1    12/2000

* cited by examiner

*Primary Examiner*—Jordan Schwartz
*Assistant Examiner*—James C Jones

(57) ABSTRACT

A modulator for a projection system includes a surface having a number of pixels defined thereon corresponding to pixels of the projection system. The pixel areas have shapes that counter a distortion of a lens of the projection system, such that distortion effects of the lens are reduced, and/or the side profile of the surface matches a field curvature of the lens of the projection system, such that field curvature effects of the lens are reduced.

10 Claims, 7 Drawing Sheets

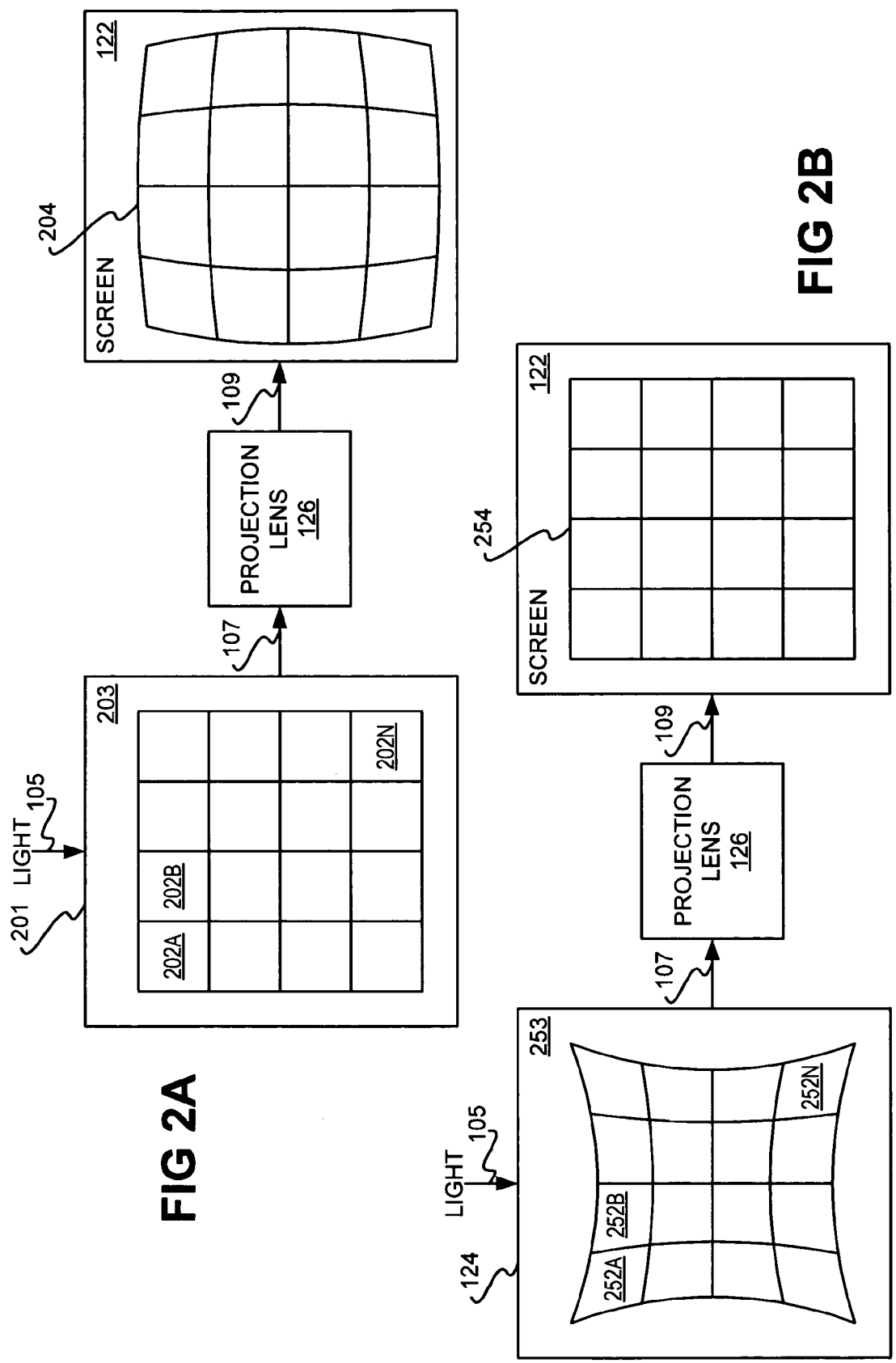

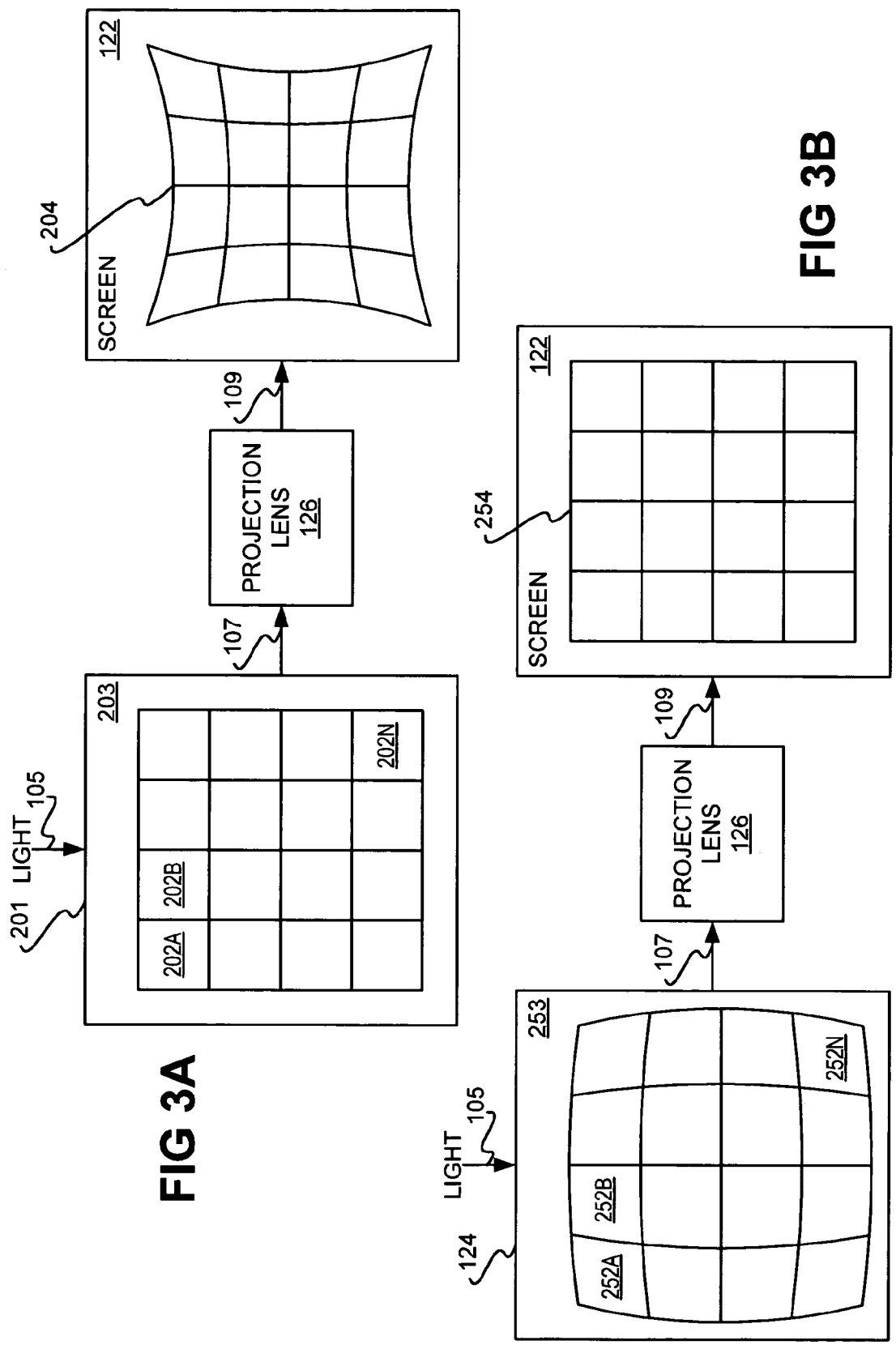

PROJECTION SYSTEM MODULATOR REDUCING DISTORTION AND FIELD CURVATURE EFFECTS OF PROJECTION SYSTEM LENS

BACKGROUND

Projection systems, or projectors, are generally devices that integrate light sources, optics systems, electronics, and spatial light modulators for projecting data such as images, video, documents, and spreadsheets from computers or video devices onto walls or front or rear screens, for large-image viewing. They are popular among business users who give presentations as part of their job responsibilities. Projectors are also finding their way into peoples' homes for high-definition television (HDTV) and other home entertainment applications.

To ensure the highest image quality, projectors typically include sophisticated projection lenses. These sophisticated lenses have high resolution, low distortion and lateral color, large field of view, high offset, and high uniformity, in addition to zoom and focusing features. Such projection lenses are often large in size and sometimes very expensive. Furthermore, it can be difficult to implement large zoom ratios and provide large adjustable offsets within such sophisticated lenses.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2A is a diagram depicting the barrel distortion effects resulting from a projection lens that has barrel distortion, according to an embodiment of the invention.

FIG. 2B is a diagram depicting how the pixel areas of a modulator can have a pincushion shape to counteract the barrel distortion of the projection lens of FIG. 2A, according to an embodiment of the invention.

FIG. 3A is a diagram depicting the pincushion distortion effects resulting from a projection lens that has pincushion distortion, according to an embodiment of the invention.

FIG. 3B is a diagram depicting how the pixel areas of a modulator can have a barrel shape to counteract the pincushion distortion of the projection lens of FIG. 3A, according to an embodiment of the invention.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Figure 1:
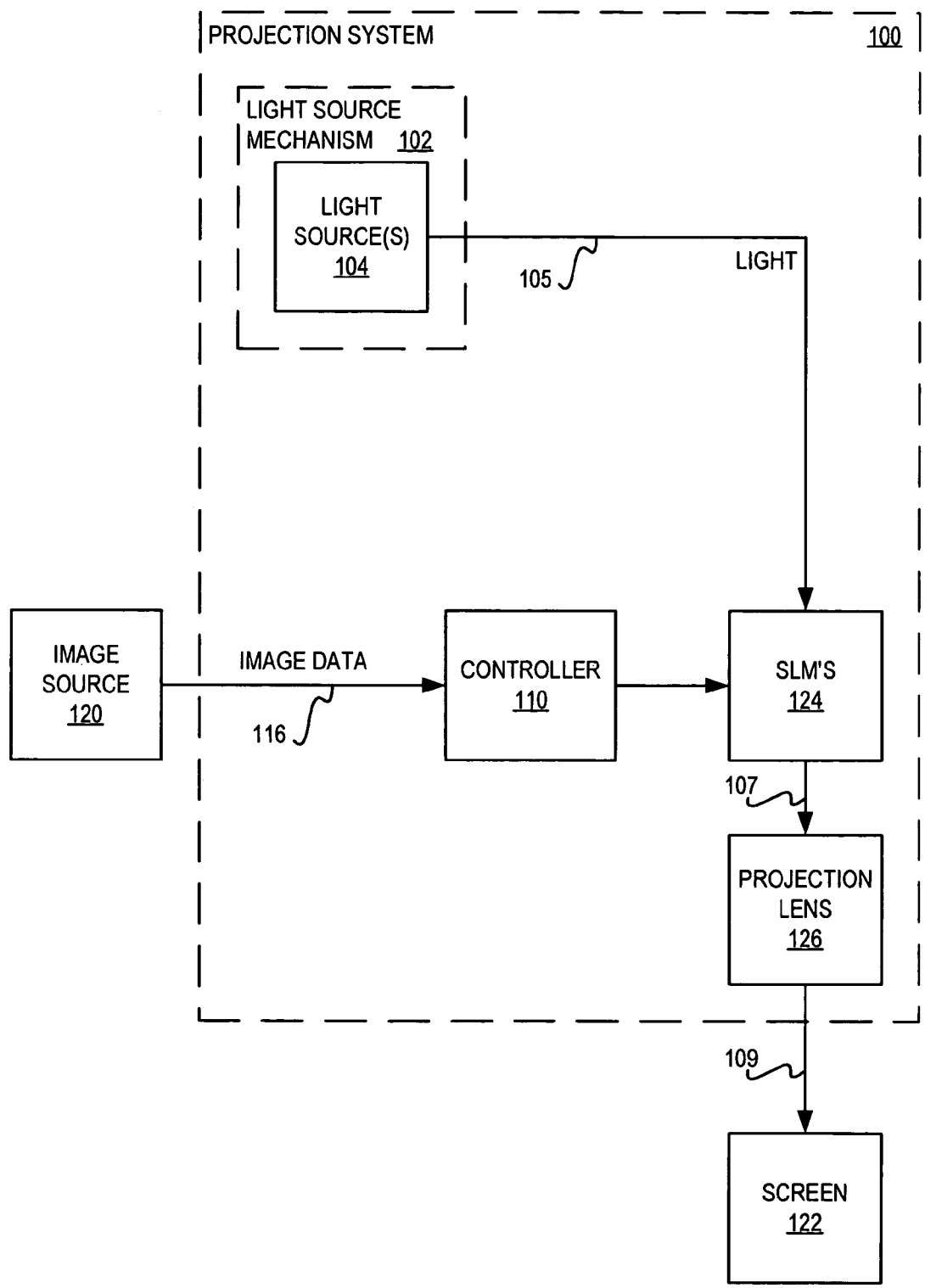
FIG. 1 is a diagram of a projection system, according to an embodiment of the invention.

FIG. 1 shows a block diagram of a projection system 100 according to an embodiment of the invention. The system 100 may be implemented as a projector. As can be appreciated by those of ordinary skill within the art, the system 100 includes components specific to a particular embodiment of the invention, but may include other components in addition to or in lieu of the components depicted in FIG. 1. The projection system 100 includes a light source mechanism 102 that includes light source(s) 104, a spatial light modulator (SLM) 124, and a projection lens 126. The SLM 124 includes a number of pixel areas defined thereon. The system 100 also includes a controller 110, and is operatively or otherwise coupled to an image source 120 to receive image data 116, as well as a screen 122.

The light source(s) 104 of the light source mechanism 102 output light, such as white light, as indicated by the arrow 105. Each of the light source(s) 104 may be an ultra high pressure (UHP) mercury vapor arc lamp, a xenon arc lamp, or another type of light source. For instance, the light source(s) may be other types of light bulbs, as well as other types of light sources such as light-emitting diodes (LED's), and so on. The light output by the light source(s) 104 is for ultimate modulation by the SLM 124, and for ultimate projection by the projection lens 126.

The controller 110 may be implemented in hardware, software, or a combination of hardware and software. The controller 110 receives image data 116 from an image source 120. The image source 120 may be a computing device, such as a computer, or another type of electronic and/or video device. The controller 110 controls the SLM 124 in accordance with a current frame of the image data 116. The image data 116 defines a number of pixels, and the SLM 124 receives control signals from controller 110 that allow the pixel areas of the SLM 124 to define an image pursuant to these corresponding pixels of the image data.

The pixel areas of the SLM 124 thus modulate the light output by the light sources 104 in accordance with the image data 116 as controlled by the controller 110. The image data 116 may be a still image or a moving image, for instance. This light is projected externally or outward from the projection system 100, as indicated by the arrow 107, through a projection lens 126, as indicated by the arrows 109, where it is displayed on the screen 122, or another physical object, such as a wall, and so on. The screen 122 may be a front screen or a rear screen, such that the projection system 100 may be a front-projection system or a rear-projection system, as can be appreciated by those of ordinary skill within the art. The user of the projection system 100, and other individuals able to see the screen 122, are then able to view the image data 116.

The SLM 124 may include multiple kinds of SLM's, which may be reflective, transmissive, or interference-type SLM's. Reflective SLM's include digital micromirror devices (DMD's), liquid crystal on silicon (LCOS) modulators, and liquid crystal display (LCD) modulators, among other types of modulators. Transmissive SLM's modulate and transmit light therethrough to project the light onto the screen 122. Interference-type SLM's rely on principles of optical interference to modulate light to project the light onto the screen 122.

Embodiments of the invention allow for the use of a less-sophisticated projection lens and still achieve desired display performance. Using a less-sophisticated projection lens provides for lower cost, smaller size, and larger field of view, as well as enhanced zoom and offset features. However, a less sophisticated projection lens may have large distortion, and/or non-uniform resolution across the field of view, which is referred to as field curvature. In order to compensate for distortion and field curvature effects, the SLM 124 has a shape that counteract the distortion of the lens 126, and a side profile that matches the field curvature of the lens 126.

Thus, embodiments of the invention allow for a less-sophisticated projection lens to be employed as the projection lens 126 within the projection system 100, with minimal or no decrease in image quality. That is, rather than employing a sophisticated, but expensive, projection lens that is at least substantially free of distortion and field curvature aberrations, embodiments of the invention can use a less-sophisticated lens that may have distortion and field curvature aberrations. The shape and profile of the SLM 124 itself are therefore designed to counteract the distortion and field curvature effects of such a less-sophisticated projection lens 126. The SLM 124 can be distorted in a variety of ways. For instance, the shape and size of the individual pixels of the modulator may be varied.

FIG. 2A shows the barrel distortion effects of a projection lens 126 that has barrel distortion, according to an embodiment of the invention. As indicated by the arrow 105, light is output towards an SLM 201 that has a number of rectangular pixel areas 202A, 202B, . . . , 202N, collectively referred to as the pixel areas 202, on a surface 203 thereof. The pixel areas 202 thus each have a rectangular shape in the X-Y plane, which is the plane of the drawing sheet on which FIG. 2A is presented. The pixel areas 202 are organized in a grid, or table, with each of the pixel areas 202 being in a particular row and in a particular column.

The light modulated by the SLM 201 is directed towards the projection lens 126, as indicated by the arrow 107, and the projection lens 126 projects the light as modulated onto the screen 122, as indicated by the arrow 109. The image 204 projected onto the screen 122 by the projection lens 126 has an undesired barrel shape, resulting from the barrel distortion of the projection lens 126. The image 204 ideally should be rectangular shaped, with rectangular pixels corresponding to the rectangular pixel areas 202 of the SLM 201. However, because the projection lens 126 has barrel distortion, the image 204 suffers from barrel distortion effects.

It is noted that distortion effects generally result from the image of an off-axis point being formed at a location on the screen 122 other than that predicted by simple paraxial equations. Distortion thus means that even if a perfect off-axis point image is formed, its location on the image plane is not correct. Furthermore, the amount of distortion usually increases with increasing image height. Distortion does not lower resolution, but rather means that the shape of the image 204 does not correspond exactly to the shape of the pixel areas 202 of the SLM 201. Distortion is a separation of the actual image point from the paraxially predicted location on the image plane and can be expressed either as an absolute value or as a percentage of the paraxial image height.

FIG. 2B shows how the barrel distortion effects of a projection lens 126 that has barrel distortion can be reduced by modifying the shape of the pixel areas of an SLM, according to an embodiment of the invention. As indicated by the arrow 105, light is output towards the SLM 124 that has a number of pixel areas 252A, 252B, . . . , 252N, collectively referred to as the pixel areas 252, on a surface 253 of the SLM 124. The pixel areas 252 each have a non-rectangular shape in the X-Y plane, which is the plane of the drawing sheet on which FIG. 2B is presented. In sum or in total, the pixel areas 252 have a pincushion shape, which is a correspondingly opposite shape to a barrel shape.

For instance, a barrel shape may be considered as resulting from fixing the corners of a rectangular grid in place, and pulling the center of the grid outward, such that the rectangles of the grid are pulled out to give the grid the shape of a barrel. By comparison, a pincushion shape may be considered as resulting from fixing the corners of the rectangular grid in place, but pushing the center of the grid inward, such that the rectangles of the gird are pushed in to give the grid the shape of a pincushion. Therefore, the barrel shape is the correspondingly opposite shape to the pincushion shape, and vice-versa.

The light modulated by the SLM 124 is directed towards the projection lens 126, as indicated by the arrow 107, and the projection lens 126 projects the light as modulated onto the screen 122, as indicated by the arrow 109. The image 254 projected onto the screen 122 by the projection lens 126 has a desired rectangular shape i even though the projection lens 126 has barrel distortion. This is because the shapes of the pixel areas 252 of the SLM 124 counteract the barrel distortion of the lens 126. That is, the pincushion shape of the pixel areas 252 of the SLM 124 as a whole counters the barrel distortion of the lens 126. Thus, the light as modulated by the pixel areas 252 of the SLM 124, as indicated by the arrow 107, may result in an image having a pincushion shape. However, the pincushion shape of the image is subsequently undone by the barrel distortion of the lens 126, in projection of the light through the lens 126 onto the screen 122, as indicated by the arrow 109.

That is, the pincushion and barrel shapes are opposite types of distortion that counteract one another. Where the projection lens 126 has barrel distortion, adding the opposite type of distortion, pincushion distortion, to the shapes of the pixel areas 252 of the SLM 124 undoes the distortion introduced by the projection lens 126, and vice-versa, resulting in reduced distortion effects in the image 254 projected onto the screen 122. At best, the distortion effects are completely reduced, and thus eliminated, in the image 122, resulting in a perfectly rectangular image 254 projected on the screen 122.

The projection lens 126 may alternatively have a pincushion distortion, such that the pixel areas of the SLM 124 instead have as a whole a barrel shape to counteract the effects of the pincushion distortion, as is now described. FIG. 3A shows the pincushion distortion effects of a projection lens 126 that has pincushion distortion, according to an embodiment of the invention. As before, as indicated by the arrow 105, light is output towards the SLM 201 having the rectangular pixel areas 202 on its surface 203. The light modulated by the SLM 201 is directed towards the projection lens 126, as indicated by the arrow 107, and the projection lens 126 projects the light as modulated onto the screen 122, as indicated by the arrow 109. The image 204 projected onto the screen 122 has an undesired pincushion shape, resulting from the pincushion distortion of the projection lens 126. Thus, FIG. 3A corresponds to FIG. 2A, except that whereas the lens 126 in FIG. 2A has barrel distortion, the lens 126 in FIG. 3A has pincushion distortion.

FIG. 3B shows how the pincushion distortion effects of a projection lens 126 that has pincushion distortion can be reduced by modifying the shape of the pixel areas of an SLM, according to an embodiment of the invention. As before, as indicated by the arrow 105, light is output towards the SLM 124 having the pixel areas 252 on its surface 253. As in FIG. 2B, the pixel areas 252 are again non-rectangular in shape in the X-Y plane, but in sum or in total, the pixel areas 252 have a barrel shape in FIG. 3B, instead of a pincushion shape as in FIG. 2B.

The light modulated by the SLM 124 is directed towards the projection lens 126, as indicated by the arrow 107, and the projection lens 126 projects the light as modulated onto the screen 122, as indicated by the arrow 109. The image 254 projected onto the screen 122 by the projection lens 126 again has a desired rectangular shape, even though the projection lens 126 has pincushion distortion. This is because the shapes of the pixel areas 252 of the SLM 124 in FIG. 3B as a whole being a barrel shape counteract the pincushion distortion of the lens 126. Thus, whereas the shapes of the pixel areas 252 of the SLM 124 in FIG. 2B as a whole have a pincushion shape to counteract the barrel distortion of the lens 126 in FIG. 2B, in FIG. 3B the opposite occurs: the pixel areas 252 of the SLM 124 as a whole have a barrel shape to counteract the pincushion distortion of the lens 126 in FIG. 3B.

It is noted that the barrel distortion of the lens 126 in FIG. 2B, such that the pixel areas 252 of the SLM 124 have a pincushion shape to counteract this distortion, and that the pincushion-distortion of the lens 126 in FIG. 3B, such that the pixel areas 252 of the SLM 124 have a barrel shape to counteract this distortion, are examples of distortion that may occur. In other embodiments, the lens 126 may have other types of distortion, such as a combination of barrel and pincushion distortion across different fields of the lens. In these embodiments, the pixel areas 252 of the SLM 124 as a whole have a shape that counteracts the distortion of the lens 126. That is, in general, the pixel areas 252 of the SLM 124 as a whole have a shape that counteracts whatever distortion exists within the lens 126.

Figure 4A:
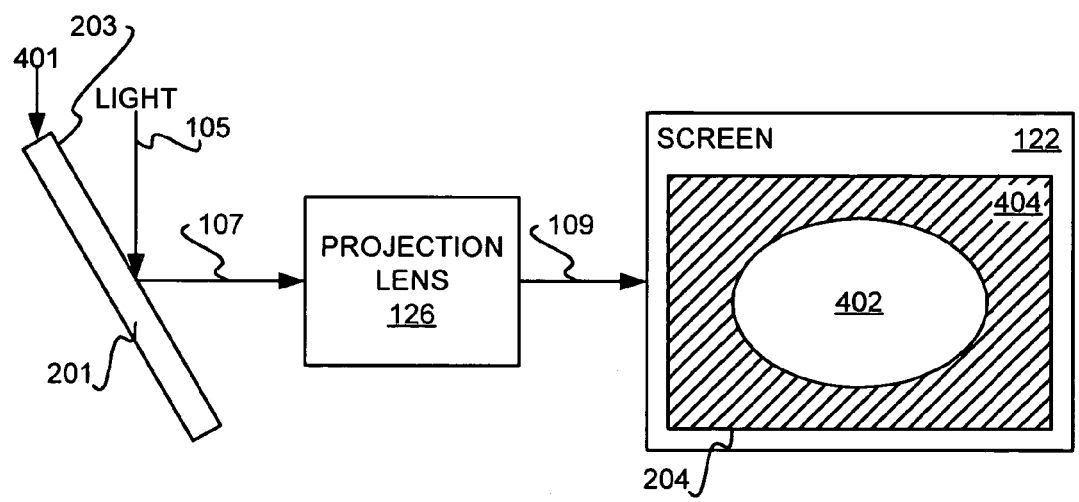
FIG. 4A is a diagram depicting the field curvature effects resulting from a projection lens that does not have internal compensation or correction for such effects, according to an embodiment of the invention.

FIG. 4A shows the field curvature effects of a projection lens 126 that has a field curvature aberration that is not corrected within the lens 126 itself, according to an embodiment of the invention. As indicated by the arrow 105, light is output towards the SLM 201, the side profile of which is depicted in FIG. 4A in the Z plane perpendicular to the X-Y plane in which the SLM 201 is depicted in FIGS. 2A and 3A. The surface 203 of the SLM 201 has a side profile 201 that is planar.

The light modulated by the SLM 201 is directed towards the projection lens 126, as indicated by the arrow 107, and the projection lens 126 projects the light as modulated onto the screen 122, as indicated by the arrow 109. The image 204 projected onto the screen 122 has a center area 402 and an outside area 404. Depending on the focus of the projection system 100 as a whole, either the center area 402 is more in focus than the outside area 404, or vice-versa. That is, the center area 402 is at a different focus than the outside area 404, such that the projection system 100 cannot be adjusted so that both the areas 402 and 404 are precisely in focus at the same time. Thus, in relation to the flat screen 122, the lens 126 focuses light differently at the center of the lens 126 as compared to the edges of the lens 126, such that light is focused better at the center than at the edges, or vice-versa.

The center area 402 having a different focus than the outside area 404 results from the field curvature aberration of the lens 126. In general, there is a tendency of optical systems to image better on curved surfaces than on flat planes, such as the screen 122. This effect is called field curvature. This problem is compounded because there are two separate astigmatic focal surfaces. Field curvature varies with the square of field angle or the square of image height. Undesirable field curvature effects—in which different parts of the image 204 being projected have different foci—are further more apparent where the SLM 201 has pixel areas 202 that are relatively large in area. However, manufacturing SLM's that have small pixel areas can be expensive, as is designing and manufacturing projection lenses that internally compensate for field curvature.

Figure 4B:
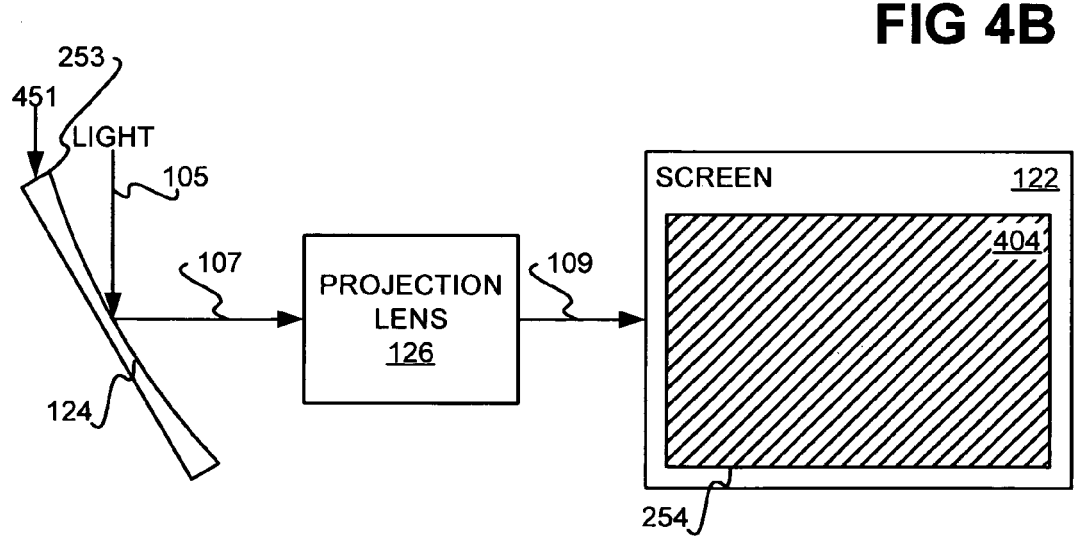
FIG. 4B is a diagram depicting how the side profile of a modulator can be non-planar and curved to counteract the field curvature of the projection lens of FIG. 4A, according to an embodiment of the invention.

FIG. 4B shows how the field curvature effects of a projection lens 126 that has a field curvature aberration that is not corrected within the lens 126 itself can be reduced by modifying the side profile of an SLM, according to an embodiment of the invention. As indicated by the arrow 105, light is output towards the SLM 124, the side profile of which is depicted in FIG. 4B in the Z plane perpendicular to the X-Y plane in which the SLM 124 is depicted in FIGS. 2B and 4B. The surface 253 of the SLM 124 has a side profile 201 that is non-planar, as will be described in more detail.

The light modulated by the SLM 201 is directed towards the projection lens 126, as indicated by the arrow 107, and the projection lens 126 projects the light as modulated onto the screen 122, as indicated by the arrow 109. The image 254 substantially has all its areas in focus, or at the same focus, as indicated by the shading of the entire image in FIG. 4B. That is, unlike the image 204 of FIG. 4A, the image 254 does not have a center area and an outside area that are at different foci.

Having the same image 254 be at substantially the same focus, even though the screen 122 remains planar, is achieved because the side profile 451 of the surface 253 of the SLM 124 has a curvature that matches the field curvature of the projection lens 126. That is, the side profile 451 of the SLM 124 matches the field curvature of the projection lens 126, which reduces the field curvature effects of the projection lens 126 when projecting an image onto the screen 122. The pixel areas 252 of FIGS. 2B and 3B are thus fabricated on a surface 253 that is non-planar and curved.

In FIG. 4A, the projection lens 126 focuses image points from a planar SLM 201 onto a theoretical curved surface resembling a curved bowl. The nominal curvature of this surface is the reciprocal of the lens radius and is referred to as the Petzval field curvature of the lens 126. However, the actual surface that the projection lens 126 projects the image points on is a flat or planar surface, the screen 122. Therefore, curvature of field, or field curvature, of the lens 126 causes the undesired different focus at different areas of the image 204 projected onto a flat or planar surface, such as the screen 122.

However, in FIG. 4B, the projection lens 126 focuses image points from a non-planar, curved SLM 124. The side profile 451 of the surface 253 of the SLM 124 has a curvature matching the Petzval field curvature of the lens 126. As a result, the projection lens 126 focus image points onto an actual flat or planar surface, the screen 122. The side profile 451 of the SLM 124 having the same Petzval curvature as the lens 126 results in the lens 126 completely focusing an image onto an actual flat surface, instead of onto a theoretical curved surface. Therefore, the side profile of the SLM 124 being non-planar and curved results in reduction, if not elimination, of the field curvature effects of the projection lens 126.

The side profile 451 of the surface 253 of the SLM 124 may be spherical, aspherical, concave, or convex, depending on the Petzval curvature of the projection lens 126. The side profile 451 of the SLM 124 is said to match the field curvature of the projection lens 126 in that the side profile 451 has the same curvature as the field curvature of the lens 126. In this way, field curvature effects of the lens 126 are reduced. It is noted that reduction of field curvature effects, as well as distortion effects, as described herein, encompasses a complete elimination of such effects.

Figure 5:
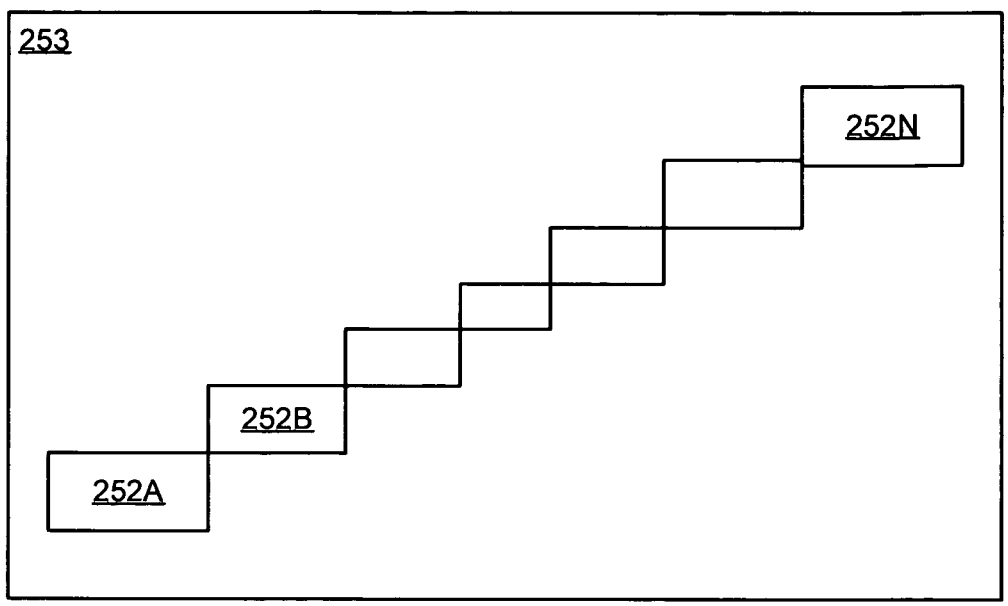
FIG. 5 is a diagram depicting how pixel areas of a modulator can have different sizes depending on their location on the modulator, to have different resolutions realized in different portions of the modulator, according to an embodiment of the invention.

FIG. 5 shows how the pixel areas 252 defined on the surface 253 of the SLM 124 can further vary in size depending on their location on the surface 253, according to an embodiment of the invention. Just some of the pixel areas 252 are depicted in FIG. 5 for illustrative convenience. The pixel areas 252 towards the center of the surface 253 of the SLM 124 are smaller in size than the pixel areas 252 towards the outside edges of the surface 253 of the SLM 124, which are larger in size.

As a result, the resolution of the SLM 124 is greater towards its center than towards it outside edges, such that an image that is projected due to light modulated by such an SLM 124 will have greater resolution and the center than at its outside edges. This can be desirable, because in projection systems intended for video in particular, there is typically more interest in the center of the video than at the outside edges of the video. Thus, an SLM having greater resolution in the center may provide greater apparent image quality as compared to another SLM that has constant resolution over its entire surface, even though both SLM's have the same resolution.

The SLM 124 that has thus far been described in accordance with different embodiments of the invention is symmetrical. In particular, the shape of the pixel areas 252 defined on the surface 253 of the SLM 124 in FIGS. 2B and 3B as a whole is symmetrical from left to right and from top to bottom. Likewise, the side profile 451 of the surface 253 of the SLM 124 in FIG. 4B is symmetrical, as are the differently sized pixel areas 252 in FIG. 5. Such symmetry provides for optimal image quality when the projection system 100 is centered vertically and horizontally with respect to the screen 122, insofar as image projection is concerned, such that the projection system 100 is projecting images on-axis in relation to the center of the screen 122. However, in actual use, the projection system 100 may be offset vertically and/or horizontally with respect to the screen 122, such that the projection system 100 is projecting images off-axis as compared to the center of the screen 122, which can affect image quality.

Figure 6A:
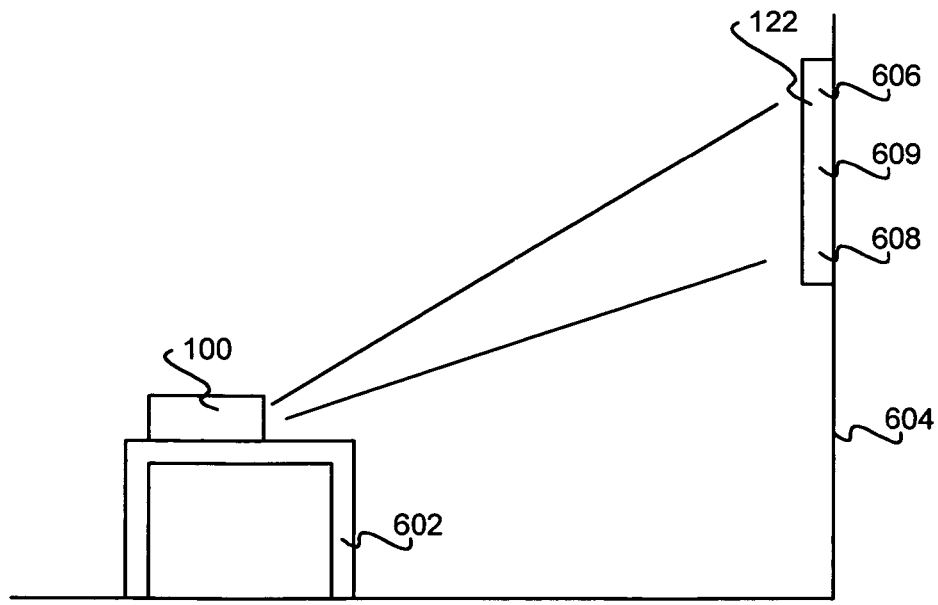
FIG. 6A is a diagram depicting a typical vertically offset usage scenario of a projection system, according to an embodiment of the invention.

FIG. 6A shows such a typical offset usage scenario for the projection system 100, according to an embodiment of the invention. The screen 122 is mounted on a wall 604, whereas the projection system 100 is placed on a table 602. As a result, the projection system 100 projects an image vertically upward onto the screen 122 on the wall 604. That is, the projection system 100 is not vertically centered with respect to the screen 122 insofar as image projection is concerned, but rather is vertically offset downwards from the screen 122. Alternatively or additionally, the projection system 100 may further be horizontally offset with respect to the screen 122, such that it is positioned to the left or to the right of the screen 122, and not horizontally centered with respect to the screen 122 insofar as image projection is concerned.

Such offset projection of images by the projection system 100 onto the screen 122 can affect image quality. In particular, the portion of the image projected onto the part 606 of the screen 122 that is farther away from the projection system 100 and/or onto the part 608 of the screen 122 that is closest to the projection system 100 may have differing image quality as compared the portion of the image projected onto the center part 609 of the screen 122. For instance, the portion of the image projected onto the part 606 of the screen 122 and/or onto the part 608 of the screen 122 may be out of focus when the portion of the image projected onto the part 609 of the screen 122 is in focus, and vice-versa.

To optimize image quality in offset usage scenarios for the projection system 100, asymmetry may be introduced into the SLM 124. In one embodiment, asymmetry may be introduced in the shape as a whole of the pixel areas 252 defined on the surface 253 of the SLM 124. In another embodiment, asymmetry may be introduced in the side profile of the surface 253 of the SLM 124. Such asymmetry reflects the asymmetry in offset usage of the projection system 100, and thus corrects for this offset usage to provide for optimal image quality. That is, such asymmetry counteracts the off-axis nature of the offset usage of the projection system 100 to provide for optimal image quality. Horizontal asymmetry may be introduced to correct for horizontal offset usage of the projection system 100, whereas vertical asymmetry may be introduced to compensate for vertical offset usage of the projection system 100.

Figure 6B:
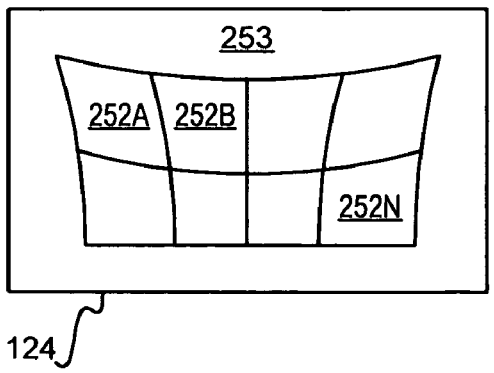
FIGS. 6B, 6C, and 6D are diagrams depicting how asymmetry can be introduced into a modulator to provide for optimal image quality in an offset usage scenario, such as that of FIG. 6A, according to varying embodiments of the invention.
Figure 6C:
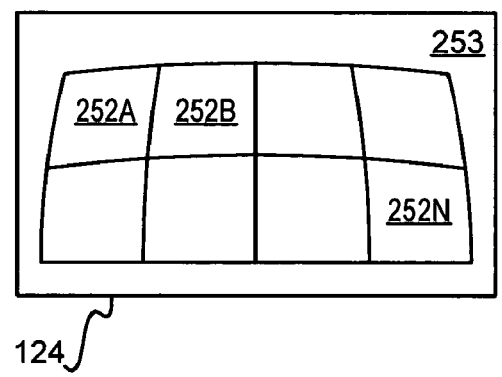

FIGS. 6B and 6C show an example of the shape of the pixel areas 252 defined on the surface 253 of the SLM 124 having vertical asymmetry to compensate for vertical offset usage of the projection system 100, according to an embodiment of the invention. In FIG. 6B, the shape of the pixel areas 252 as a whole is a partial pincushion shape, whereas in FIG. 6C, the shape of the pixel areas 252 as a whole is a partial barrel shape. Thus, the SLM 124 in FIG. 6B reduces barrel distortion effects even when the projection system 100 is being used in a vertically offset manner, particularly where the system 100 is located vertically below the screen 122. Similarly, the SLM 124 in FIG. 6C reduces pincushion distortion effects even when the projection system 100 is being used in a vertically offset manner, particularly where the system 100 is located vertically below the screen 122.

Figure 6D:
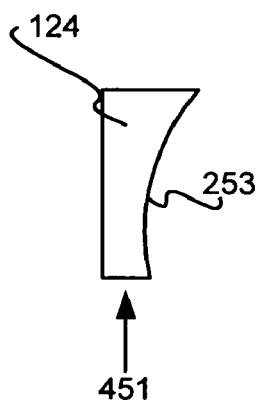

FIG. 6D shows an example of the side profile 451 of the surface 253 of the SLM 124 having vertical asymmetry to compensate for vertical offset usage of the projection system 100, according to an embodiment of the invention. The side profile 451 is particularly depicted as being partially concave, but it may alternatively be partially convex, partially spherical or aspherical, and so on. The side profile 451 of the SLM 124 matches the field curvature of the projection lens 126, as has been described in relation to FIG. 4B, even when the projection system 100 is being used in a vertically offset manner, particularly where the system 100 is located vertically below the screen 122.

Figure 7:
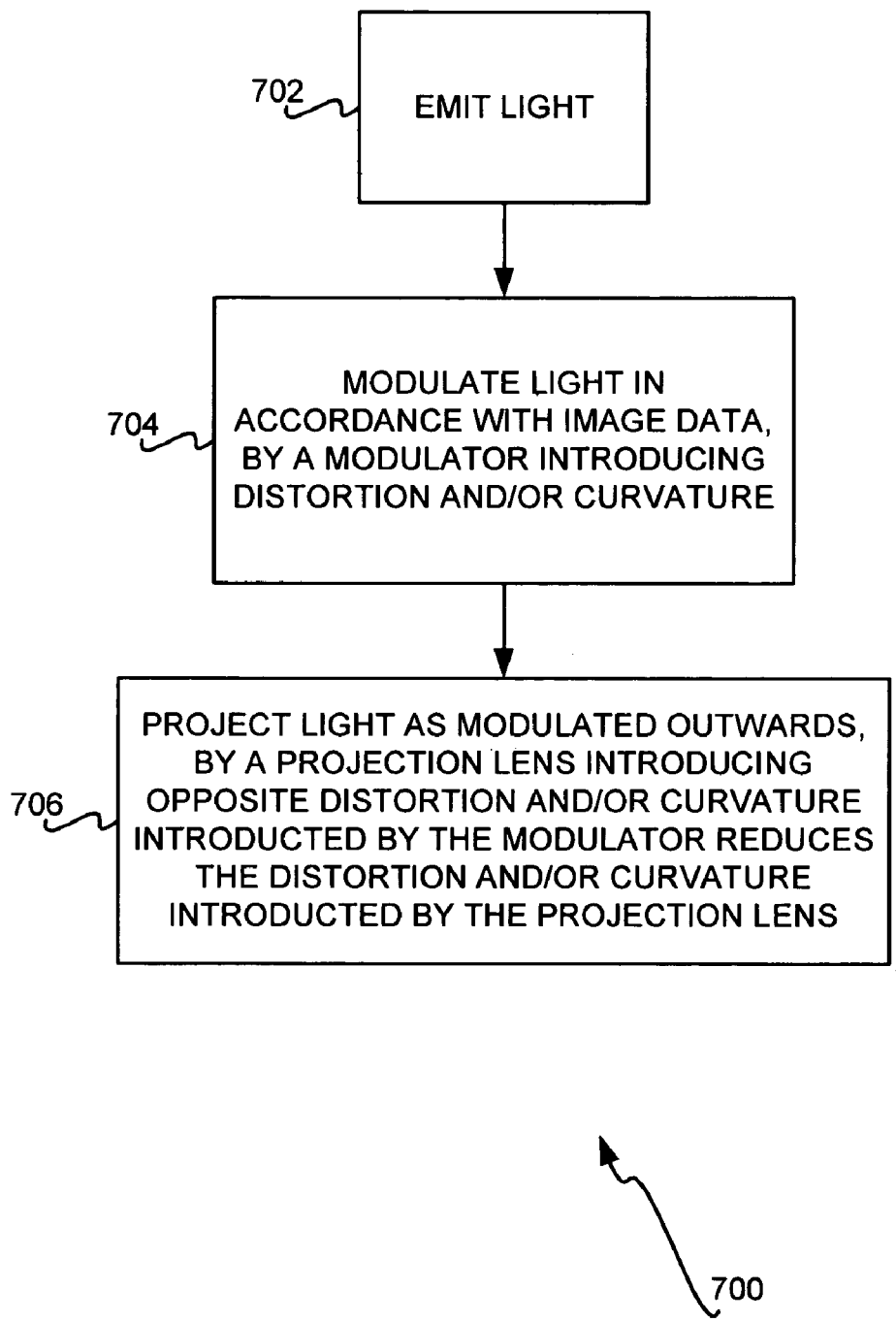
FIG. 7 is a flowchart of a method for projecting light in accordance with image data, according to an embodiment of the invention.

FIG. 7 shows a method 700 for projecting light in accordance with image data, according to an embodiment of the invention. The method 700 may be performed in relation to the projection system 100 having the SLM 124 and the projection lens 126 that have been described. Light is emitted (702), which is modulated in accordance with image data using a modulator, such as the SLM 124 (704). As has been described in relation to FIGS. 2B and 3B, the modulator may introduce distortion into the image being projected by the light, to counteract the distortion that is inherent within the projection lens 126.

As has been further described in relation to FIG. 4B, the modulator may also introduce field curvature into the image, to match and thus counteract the field curvature that is inherent within the projection lens 126. The modulator may further have differently sized pixels, as has been described in relation to FIG. 5B, and may be symmetric, or asymmetric as has been described in relation to FIGS. 6B, 6C, and 6D. The light as has been modulated is then projected outwards using the projection lens 126 (706). The distortion and/or field curvature introduced by the projection lens 126 is thus counteracted by the corresponding distortion and/or field curvature introduced by the modulator, to improve image quality.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A modulator for a projection system comprising at least one of:
   a surface having a number of pixel areas defined thereon corresponding to pixels of the projection system; and,
   a side profile of the surface,
   wherein one or more of:
      shapes of the pixel areas are rectangular and different of the pixel areas have different sizes, such that the pixel areas towards a center of the surface are smaller in size and the pixel areas towards outside edges of the surface are larger in size;
      a side profile of the surface is asymmetrical from top to bottom of the side profile of the surface to optimize image quality during usage of the projection system in an offset manner.

2. The modulator of claim 1, wherein the shapes of the pixel areas are non-rectangular.

3. The modulator of claim 1, wherein the shapes of the pixel areas counteract a pincushion distortion of the lens of the projection system such that pincushion distortion effects of the lens are reduced.

4. The modulator of claim 1, wherein the shapes of the pixel areas counteract a barrel distortion of the lens of the projection system such that barrel distortion effects of the lens are reduced.

5. The modulator of claim 1, wherein the modulator is one of digital micromirror device (DMD) modulator, a liquid crystal on silicon (LCOS) modulator, and a liquid crystal display (LCD) modulator.

6. A modulator for a projection system comprising:
   a plurality of pixel areas,
   wherein one or more of:
      shapes of the pixel areas are rectangular and different of the pixel areas have different sizes, such that the pixel areas towards a center of the modulator are smaller in size and the pixel areas towards outside edges of the modulator are larger in size;
      a side profile of the modulator is asymmetrical from top to bottom of the side profile of the modulator to optimize image quality during usage of the projection system in an offset manner.

7. A projection system comprising:
   a modulator having a number of pixel areas to modulate light in accordance with image data;
   a lens to project the light as modulated by the pixel areas of the modulator outwards from the projection system,
   wherein one or more of:
      shapes of the pixel areas are rectangular and different of the pixel areas have different sizes, such that pixel areas towards a center of the modulator are smaller in size and the pixel areas towards outside edges of the modulator are larger in size;
      a side profile of the modulator is asymmetrical from top to bottom of the side profile of the modulator to optimize image quality during usage of the projection system in an offset manner.

8. The projection system of claim 7, wherein the shapes of the pixel areas are non-rectangular, and counteract one of a pincushion distortion and a barrel distortion of the lens.

9. A method comprising:
   emitting light;
   modulating the light emitted in accordance with image data, by a modulator; and,
   projecting the light as modulated outwards,
   wherein one or more of:
      shapes of pixel areas of the modulator are rectangular and different of the pixel areas have different sizes, such that pixel areas towards a center of the modulator are smaller in size and the pixel areas towards outside edges of the modulator are larger in size;
      a side profile of the modulator is asymmetrical from top to bottom of the side profile of the modulator to optimize image quality during usage of the method in an offset manner.

10. The method of claim 9, wherein projecting the light as modulated outwards comprises projecting the light through a lens having a distortion and a field curvature.

* * * * *